United States Patent
Sailer et al.

(10) Patent No.: US 12,513,178 B2
(45) Date of Patent: Dec. 30, 2025

(54) COMPOUND THREAT DETECTION FOR A COMPUTING SYSTEM

(71) Applicant: INTERNATIONAL BUSINESS MACHINES CORPORATION, Armonk, NY (US)

(72) Inventors: Anca Sailer, Scarsdale, NY (US); Yuji Watanabe, Chuouku (JP)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 18/225,038

(22) Filed: Jul. 21, 2023

(65) Prior Publication Data

US 2025/0030718 A1    Jan. 23, 2025

(51) Int. Cl.
*H04L 9/40* (2022.01)

(52) U.S. Cl.
CPC ...... *H04L 63/1433* (2013.01); *H04L 63/1416* (2013.01); *H04L 63/20* (2013.01)

(58) Field of Classification Search
CPC .. G06F 21/55; G06F 51/606; G06F 2221/034; H04L 63/20; H04L 63/1416; H04L 63/1425; H04L 63/1433
See application file for complete search history.

(56) References Cited

U.S. PATENT DOCUMENTS

| | | | |
|---|---|---|---|
| 10,079,859 B2 | 9/2018 | Lang et al. | |
| 10,417,554 B2 | 9/2019 | Scheffler | |
| 2020/0162500 A1* | 5/2020 | Ciocarlie | H04L 67/12 |
| 2021/0286899 A1 | 9/2021 | Schroeder et al. | |
| 2022/0171697 A1 | 6/2022 | Moukahal et al. | |
| 2022/0245260 A1* | 8/2022 | Priller | H04L 63/1433 |
| 2023/0222223 A1* | 7/2023 | Lahmadi | H04L 63/1433 726/25 |
| 2024/0134979 A1* | 4/2024 | Kravtsov | G06F 21/577 |

OTHER PUBLICATIONS

Peled, O., "How Fuzzing Complements Penetration Testing For Optimal Vehicle Cybersecurity," [online] Argus Cyber Security Ltd. Copyright © All Rights Reserved 2023 May 20, 2021, retrieved from the Internet: <https://argus-sec.com/how-fuzzing-complements-penetration-testing-for-optimal-vehicle-cybersecurity/>, 3 pg.

(Continued)

*Primary Examiner* — Tom Y Chang
(74) *Attorney, Agent, or Firm* — CHIP LAW GROUP

(57) ABSTRACT

A topology graph for a computing system can be collected. An environment and application policy posture for at least one regulation relevant to the computing system can be collected. A plurality of penetration tests can be generated, the plurality of penetration tests determined based on the at least one topology graph for the computing system and the environment and application policy posture for the at least one regulation relevant to the computing system. The plurality of penetration tests can be run against the computing system, the plurality of penetration tests determining a plurality of threat vectors and at least one threat linkage between at least two of the plurality of threat vectors. The threat vectors and the at least one threat linkage between the at least two of the plurality of threat vectors can be output.

20 Claims, 9 Drawing Sheets

(56) References Cited

OTHER PUBLICATIONS

"Reinforcement Learning For Fuzzing Testing Techniques," IP.com Prior Art Database Technical Disclosure, IP.com No. IPCOM000252021D, Dec. 13, 2017, 36 pg.

"Threat Detection System In An Self-Drive Vehicle To Pre-Detect An Attack By A Mob Of Human Beings," IP.com Prior Art Database Technical Disclosure, IP.com No. IPCOM000259528D, Aug. 19, 2019, 6 pg.

"Agile Situation Detection Methodology," IP.com Prior Art Database Technical Disclosure, IP.com No. IPCOM000263207D, Aug. 6, 2020, 11 pg.

Jajodia, S. et al., "Topological analysis of network attack vulnerability," Managing Cyber Threats: Issues, Approaches, and Challenges, Chap. 5, 2005, pp. 247-266.

Li, Z. et al., "A hierarchical approach for advanced persistent threat detection with attention-based graph neural networks," Security and Communication Networks, May 4, 2021, vol. 2021, Art. 9961342, 14 pg.

Wang, S. et al., "Threatrace: Detecting and tracing host-based threats in node level through provenance graph earning," arXiv preprint, arXiv: 2111.04333, Nov. 8, 2021. 8, 13 pg.

Wang, Y. et al., "A systematic review of fuzzing based on machine learning techniques," PloS one, Aug. 2020. 18, vol. 15, No. 8, Art. e0237749, 20 pg.

Zheng, S. et al., "Topological Detection of Trojaned Neural Networks," arXiv pre-prints, arXiv: 2106.06469v1, Jun. 11, 2021, 20 pg.

Mell, P. et al., The NIST Definition of Cloud Computing, National Institute of Standards and Technology, U.S. Dept. of Commerce, Special Publication 800-145, Sep. 2011, 7 pg.

Joint Task Force, "Security and privacy controls for information systems and organizations," NIST Special Publication (SP) 800-53, Rev. 5, National Institute of Standards and Technology, Sep. 2020, 492 pg., (Split into 3 Sections due to File Size Limitations).

* cited by examiner

COMPOUND THREAT DETECTION FOR A COMPUTING SYSTEM

BACKGROUND

The present invention relates to data processing systems, and more specifically, to computer security.

Computer security, also known as cyber security, digital security and information technology security, is the protection of computer systems and networks from attack by malicious actors that may result in unauthorized information disclosure, theft of data, and/or damage to hardware, software and/or data. The field of computer security is significant due to the expanded reliance on data processing systems, the Internet and wireless networking. Indeed, continued growth in the use of smart devices, such as smart phones, smart televisions, etc., as well as growth in the Internet of Things, makes computer security of utmost importance in the digitally connected world.

SUMMARY

A method includes collecting at least one topology graph for a computing system. The method also can include collecting an environment and application policy posture for at least one regulation relevant to the computing system. The method also can include generating, using a processor, a plurality of penetration tests, the plurality of penetration tests determined based on the at least one topology graph for the computing system and the environment and application policy posture for the at least one regulation relevant to the computing system. The method also can include, responsive to generating the plurality of penetration tests, running the plurality of penetration tests against the computing system, the plurality of penetration tests determining a plurality of threat vectors and at least one threat linkage between at least two of the plurality of threat vectors. The method also can include, responsive to running the plurality of penetration tests against the computing system, outputting the plurality of threat vectors and the at least one threat linkage between the at least two of the plurality of threat vectors.

A system includes a processor programmed to initiate executable operations. The executable operations include collecting at least one topology graph for a computing system. The executable operations also can include collecting an environment and application policy posture for at least one regulation relevant to the computing system. The executable operations also can include generating a plurality of penetration tests, the plurality of penetration tests determined based on the at least one topology graph for the computing system and the environment and application policy posture for the at least one regulation relevant to the computing system. The executable operations also can include, responsive to generating the plurality of penetration tests, running the plurality of penetration tests against the computing system, the plurality of penetration tests determining a plurality of threat vectors and at least one threat linkage between at least two of the plurality of threat vectors. The executable operations also can include, responsive to running the plurality of penetration tests against the computing system, outputting the plurality of threat vectors and the at least one threat linkage between the at least two of the plurality of threat vectors.

A computer program product includes a computer readable storage medium having program code stored thereon. The program code is executable by a data processing system to initiate operations. The operations include collecting at least one topology graph for a computing system. The operations also can include collecting an environment and application policy posture for at least one regulation relevant to the computing system. The operations also can include generating a plurality of penetration tests, the plurality of penetration tests determined based on the at least one topology graph for the computing system and the environment and application policy posture for the at least one regulation relevant to the computing system. The operations also can include, responsive to generating the plurality of penetration tests, running the plurality of penetration tests against the computing system, the plurality of penetration tests determining a plurality of threat vectors and at least one threat linkage between at least two of the plurality of threat vectors. The operations also can include, responsive to running the plurality of penetration tests against the computing system, outputting the plurality of threat vectors and the at least one threat linkage between the at least two of the plurality of threat vectors.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
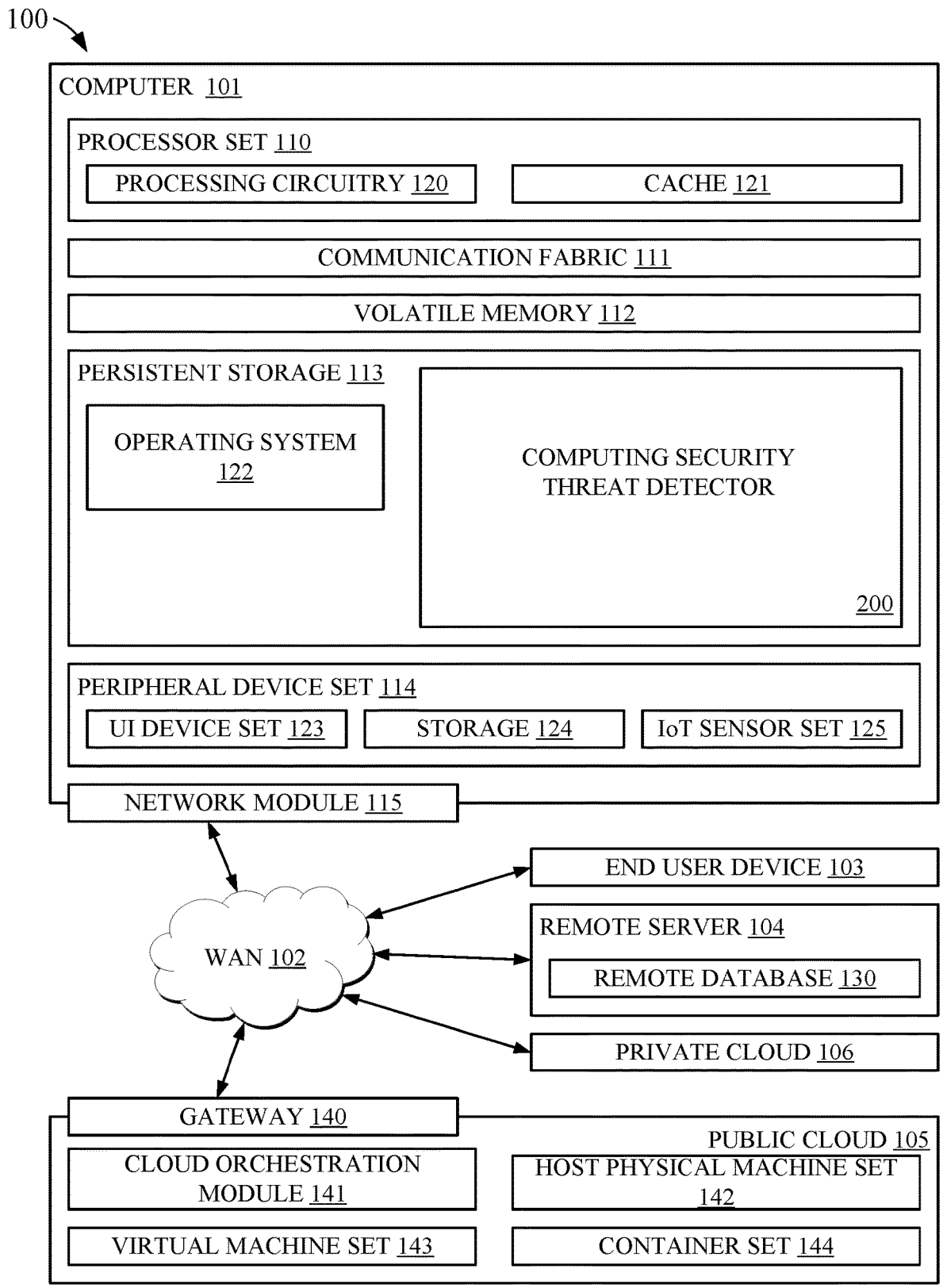
FIG. 1 is a block diagram illustrating an example of a network data processing system.

The arrangements described herein are directed to computer technology, and provide an improvement to computer technology. Specifically, the present arrangements improve computer security by implementing compound threat detection for a computing system. The compound threat detection can include not only detecting threat vectors, but also one or more threat linkages between threat vectors. The present arrangements can output the threat vectors and threat linkages to a graph. The graph can indicate things that can go wrong with respect to security of the computing system and elements of the computing system. Each threat vectors can be indicated in the graph to align with the thing that can go wrong due to the threat vector, and to align with the element of the computing system where the thing that can go wrong can occur. Further, threat linkages between threat vectors also can be indicated in the graph, thus indicating a compound threat vector.

It usually is difficult to identify which of individual security vulnerabilities corroborate onto compound data exploit entries. Generation of the graph address this problem by facilitating identification of threat vectors and compound threat vectors in the computing system. This mitigates the risk of threat vectors and compound threat vectors being missed when reviewing results of penetration testing and/or fuzzing tests.

Moreover, the present arrangements automate generation and implementation of penetration tests based on at least one topology graph for the computing system and the environment and application policy posture for the at least one regulation relevant to the computing system. The present arrangements also automate generation and implementation of fuzzing tests, which addresses problems presently existing in computer security. Specifically, there is a significant problem with seed space explosion, i.e., the large space of potential input variations and combinations to cover in a complex computing environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as computing security threat detector (CSTD) 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
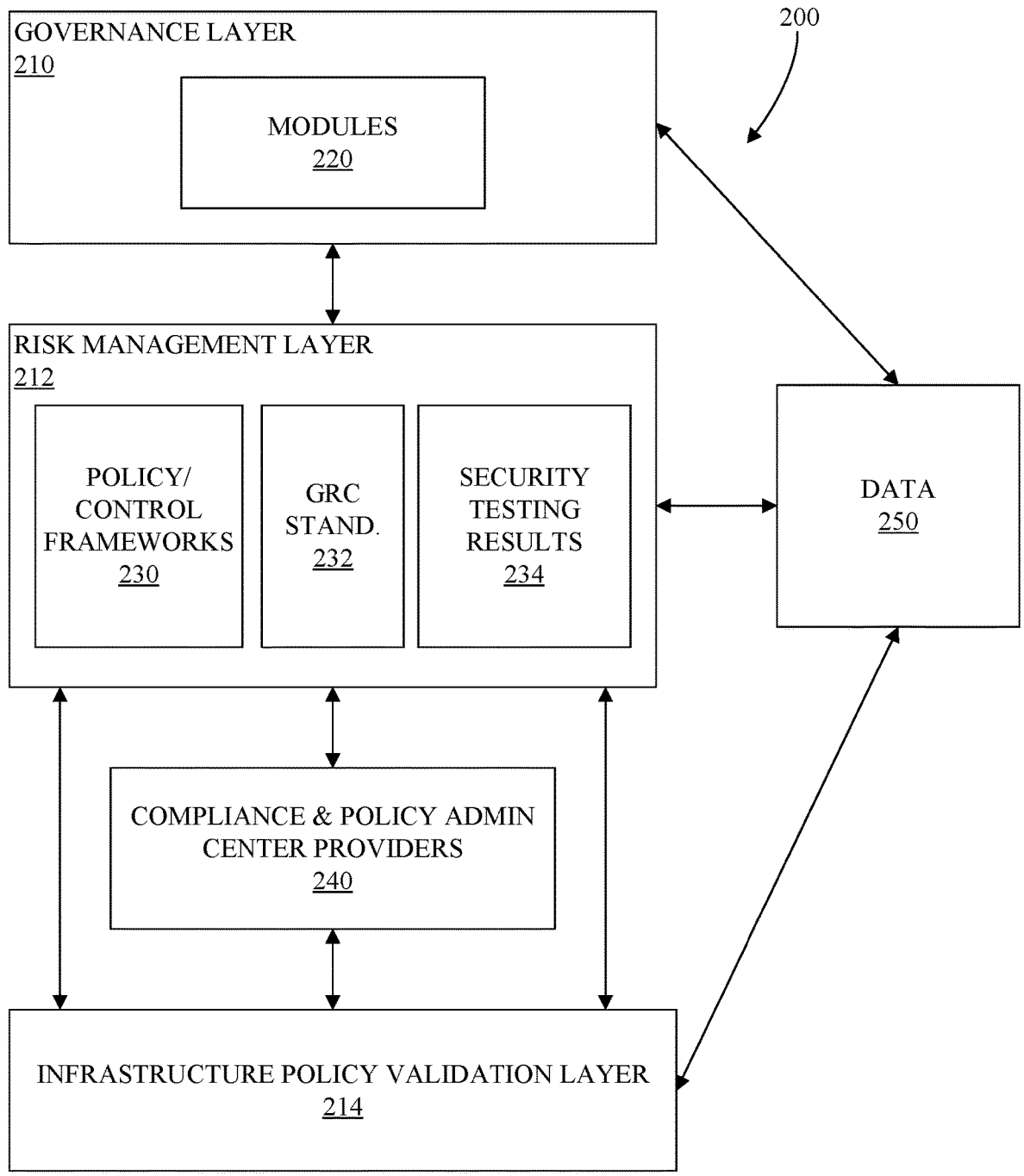
FIG. 2 is a block diagram illustrating example architecture for computing security threat detector.

FIG. 2 is a block diagram illustrating example architecture for computing security threat detector (CSTD) 200. CSTD 200 can include a governance layer 210, a risk management layer 212 and an infrastructure policy validation layer 214.

Figure 3:
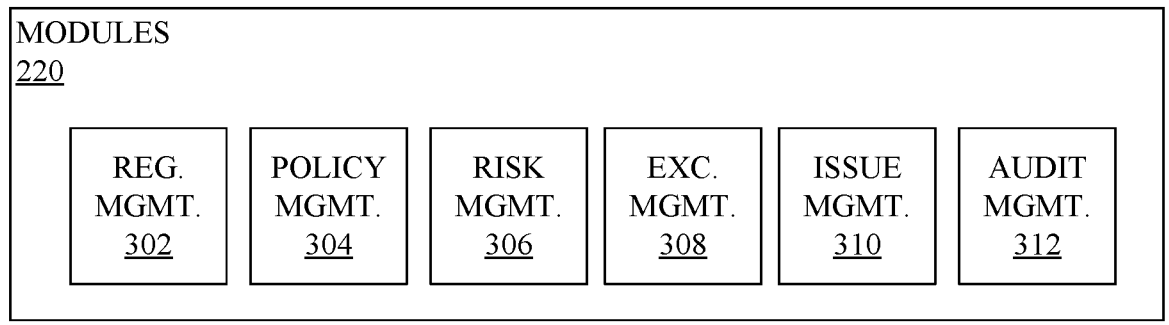
FIG. 3 is a block diagram illustrating examples of modules of a governance layer of the computing security threat detector.

Governance layer 210 can perform business risk prioritization with regard to computing security. Governance layer 210 can include a plurality of modules 220 comprising data pertaining to governance of computing security risks, computing security risk management, and compliance of computing security in accordance with one or more policies/ control frameworks. Referring to FIG. 3, the modules 220 can include, for example, a regulatory management module 302, a policy management module 304, a risk management module 306, an exception management module 308, an issue management module 310 and an audit management module 312. Users can interface with governance layer to add data, edit data and delete data in the various modules 220 for which the users are authorized to access. Examples of such users include, but are not limited to, a line of business owner, a compliance officer, a subject matter expert, a computing security compliance architect, etc.

Referring again to FIG. 2, risk management layer 212 can detect compound computing security risks and determine ontology of the computing security risks. Risk management layer 212 can include a policy/control framework 230 and governance, risk management and compliance (GRC) standardization.

Policy/control frameworks 230 can include one or more cybersecurity frameworks. Example of such cybersecurity frameworks include, but are not limited to, the National Institute of Standards and Technology (NIST) publication 800-53, titled Security and Privacy Controls for Information Systems and Organizations, Payment Card Industry (PCI) security standards, General Data Protection Regulation (GDPR) data protection rules, Center for Internet Security (CIS) benchmarks, and so on.

Figure 4:
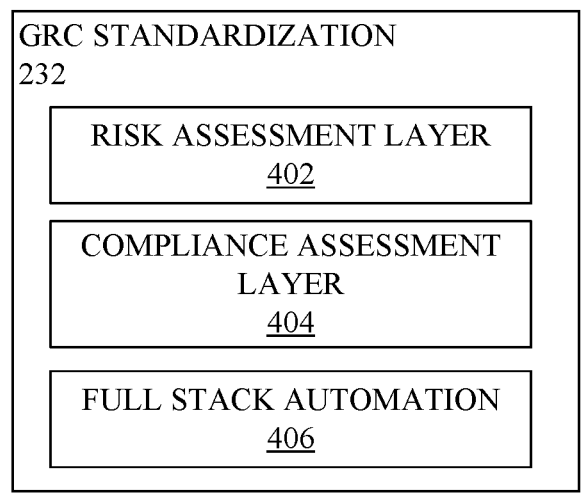
FIG. 4 is a block diagram illustrating examples of layers of a governance, risk management and compliance (GRC) standardization of the computing security threat detector.

Referring to FIG. 4, GRC standardization 232 can include a risk assessment layer 402, a compliance assessment layer 404 and full stack automation 406. Risk assessment layer 402 can assess computing security risks in a computing system for which computing security is being determined. Hereinafter, a computing system for which computing security is being determined will be referred to as a "computing system under test." Compliance assessment layer 404 can determine whether the computing system under test complies with policy/control framework 230 (FIG. 2). Full stack automation 406 can automate the processes described herein, including method 600 of FIGS. 6A and 6B, and method 800 of FIGS. 8A and 8B. Referring again to FIG. 2, GRC standardization 232 can generate security testing results 234.

Infrastructure policy validation layer 214 can validate computing security controls against policy/control framework 230 for infrastructure of the computing system under test. For example, infrastructure policy validation layer 214 can validate individual vulnerability detection, both in pre-deployment and at runtime, against policy/control framework 230. Compliance and policy administrative center providers 240 can interface with risk management layer 212 and infrastructure policy validation layer.

CSTD 200 can output data 250. Data 250 can indicate one or more computing environments of the computing system under test and topology graphs for the computing system under test. Further, data 250 can indicate risk ontology for the computing system under test. The risk ontology can include information about computing security threat vectors and vulnerabilities for various components of the computing system under test under test. For example, the risk ontology can categorize the threat vectors, categorize the vulnerabilities, and indicate the properties and relations between the threat vectors, vulnerabilities and components of the computing system under test.

Figure 5:
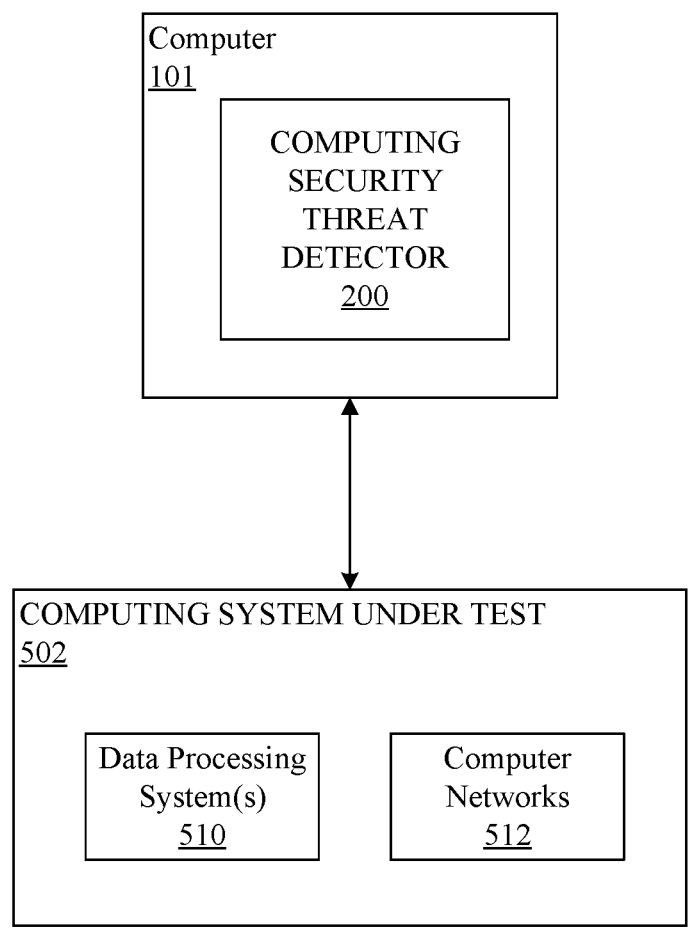
FIG. 5 is a block diagram illustrating an example of a computer for performing computing security threat detection that is communicatively linked to a computing system under test.

FIG. 5 is a block diagram illustrating an example of a computer 101 for performing computing security threat detection that is communicatively linked to a computing system under test (CSUT) 502. Computer 101 can execute CSTD 200 to perform computing security threat detection on CSUT 502. CSUT 502 can include one or more data processing systems 510 and one or more computer networks 512. Examples of data processing systems 510 include, but are not limited to, servers, client devices, edge devices, Internet of Things (IoT) devices, etc. Examples of computer networks include, but are not limited to, the Internet, WANS, LANS, personal area networks (PANs), etc.

Figure 6A:
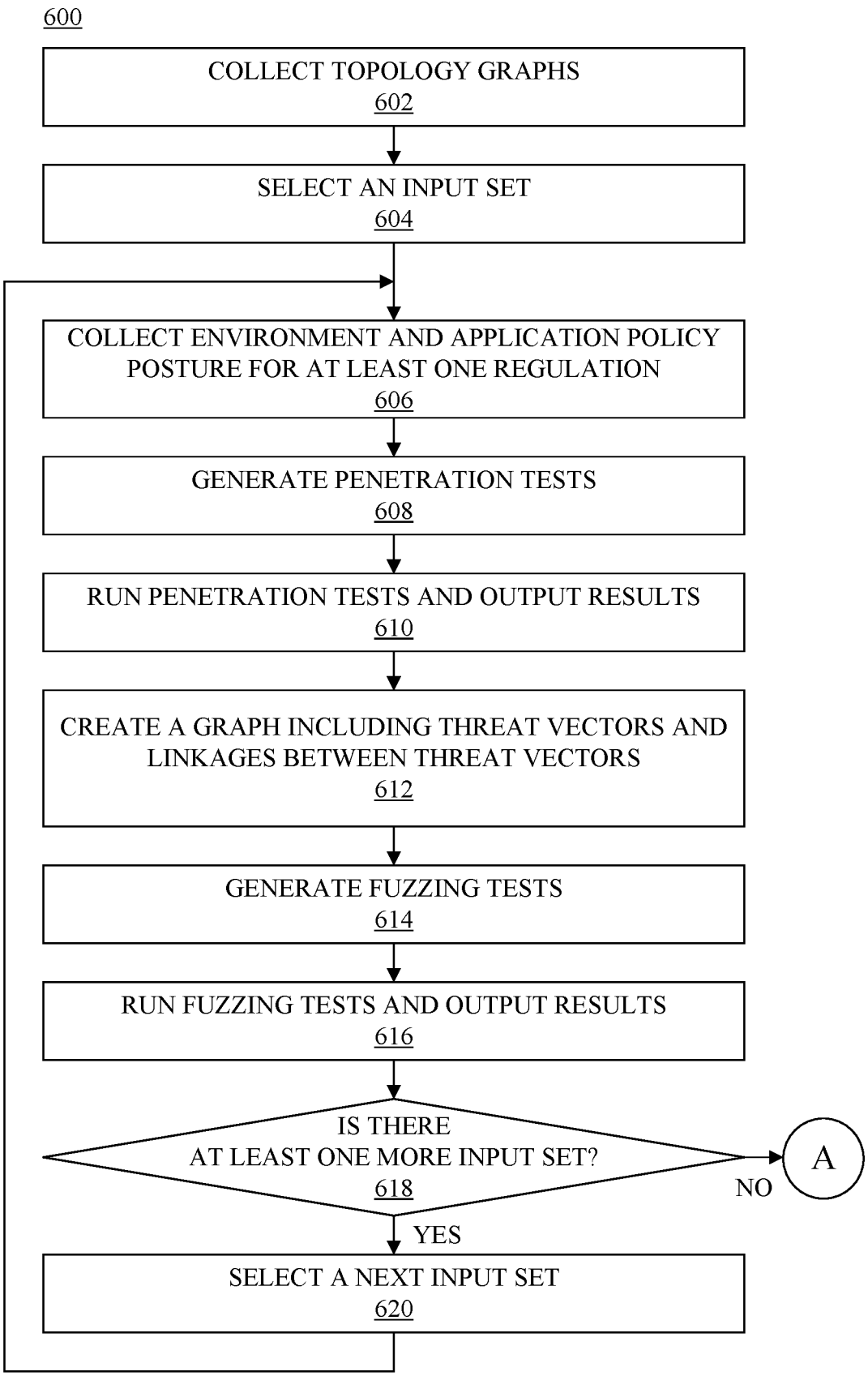
FIGS. 6A and 6B, collectively, are a flowchart illustrating an example of a method of computing security threat detection at runtime of a computing system.
Figure 6B:
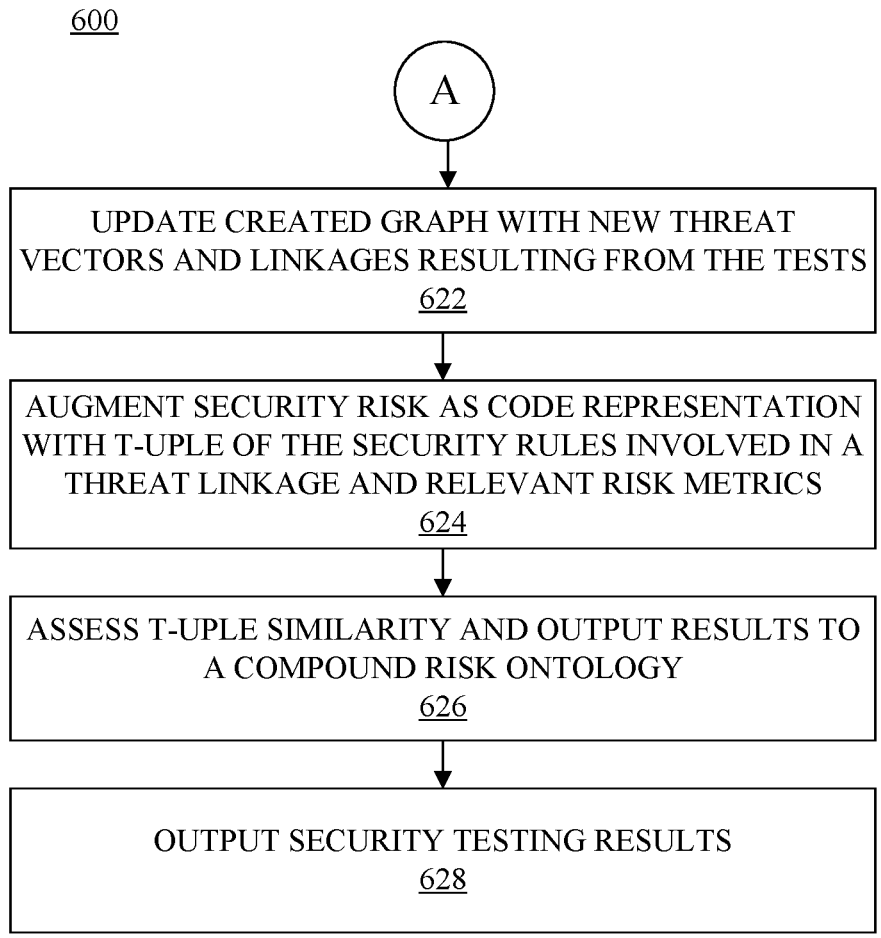

FIGS. 6A and 6B, collectively, are a flowchart illustrating an example of a method 600 of computing security threat detection at runtime of CSUT 502. Method 600 can be implemented by CSTD 200 in real time.

Referring to FIG. 6A, at step 602 CSTD 200, for example for example risk assessment layer 402, can collect a variety of topology graphs for CSUT 502. For instance, CSTD 200 can collect topology graphs for applications executing on CSUT 502, the environment of CSUT 502 (e.g., hardware components of CSUT 502, networks of CSUT 502, data hosted by CSUT 502, etc.), organization charts for one or more organizations assigned to CSUT 502, and so on. Each topology graph can indicate components of CSUT 502 as nodes, with edges connecting nodes that are assigned to components that interface with one another. CSTD 200 can execute one or more applications configured to collect topology graphs for CSUT 502. Such an application can, for example, include a scanner that traverses components of CSUT 502 and generate topology graphs based on such traversals. An application also can monitor network flows to, from and within CSUT 502, for example by interfacing with various switches, routers, access points, etc. and collecting data pertaining to network flows. An application also can crawl CSUT 502 to determine data flows to, from and among components of CSUT 502. Further, an application can collect existing charts, such as organization charts stored in one or more databases.

At step 604 CSTD 200, for example risk assessment layer 402, can select an input set from a plurality of input sets. Each input set can include one or more fields of data configured to be input to CSUT 502 during a pen-test and/or fuzzing test.

At step 606 CSTD 200, for example risk assessment layer 402, can collect environment and application policy posture for at least one regulation relevant to CSUT 502. In illustration, risk assessment layer 402 can collect the environment and application policy posture in accordance with policy/control framework 230. As noted, policy/control frameworks 230 can include NIST publication 800-53, PCI security standards, GDPR data protection rules, CIS benchmarks, and so on. The environment (e.g., virtual machines, network, databases, services, etc.) can be provided by a cloud computing provider. Applications may be provided by a client and/or the cloud computing provider. The environment policy posture and application policy posture can be, but need not be, the same. Nonetheless, GSTD 200 can generalize the full computing stack, including the environment and applications, for implementation of method 600.

At step 608 CSTD 200, for example risk assessment layer 402, can generate a plurality of pen-tests configured to test computing security of CSUT 502. The generated pen-tests can be configured to attempt to call/execute application programming interfaces (APIs) and command line interfaces (CLIs) of CSUT 502 exhibiting vulnerabilities. The pen-tests can be determined based on the collected topology graphs, the selected input set, and the environment and application policy posture for one or more regulations relevant to CSUT 502. In one or more non-limiting arrangements, the generated pen-tests can be hierarchical pen-tests. For instance, CSTD 200 can determine the hierarchy of the environment/applications of CSUT 502 based on the collected topology graphs, and generate pen-tests for each branch of the hierarchy. The hierarchy can be represented by a hierarchy graph. In the hierarchy graph, CSTD 200 can represent components of the environment/applications as nodes, with edges connecting nodes that are assigned to components that interface with one another.

At step 610 CSTD 200, for example risk assessment layer 402, can run the pen-tests against CSUT 502 and output results of the pen-tests to security testing results 234. The pen-tests can determine, as at least part of the results, threat vectors for CSUT 502 and threat linkages between the threat vectors. The threat linkages can indicate links in CSUT 502 (e.g., a pathway) through which threat vectors (e.g., compound threat vectors) may be exploited to traverse security vulnerabilities in CSUT 502. In illustration, during penetration testing, some elements of CSUT 502 may fail pen-tests. Such failures can be identified as threat vectors. Risk assessment layer 402 can run exploits on the threat vectors, testing whether hostile actions can expose security risks by traversing those threat vectors. Risk assessment layer 402 can determine intentions/actions to take to attempt to traverse the threat vectors, and determine threat linkages where a threat vector can be traversed to another threat vector. CSTD 200, for example risk assessment layer 402, can output the threat vectors and threat linkages to security testing results 234.

At step 612 CSTD 200, for example risk assessment layer 402, can create a graph that includes a plurality of threat vectors, and threat linkages between at least two of the threat vectors, that are detected by the pen-tests. CSTD 200 can output the graph of threat vectors and threat linkages to security testing results 234.

Figure 7:
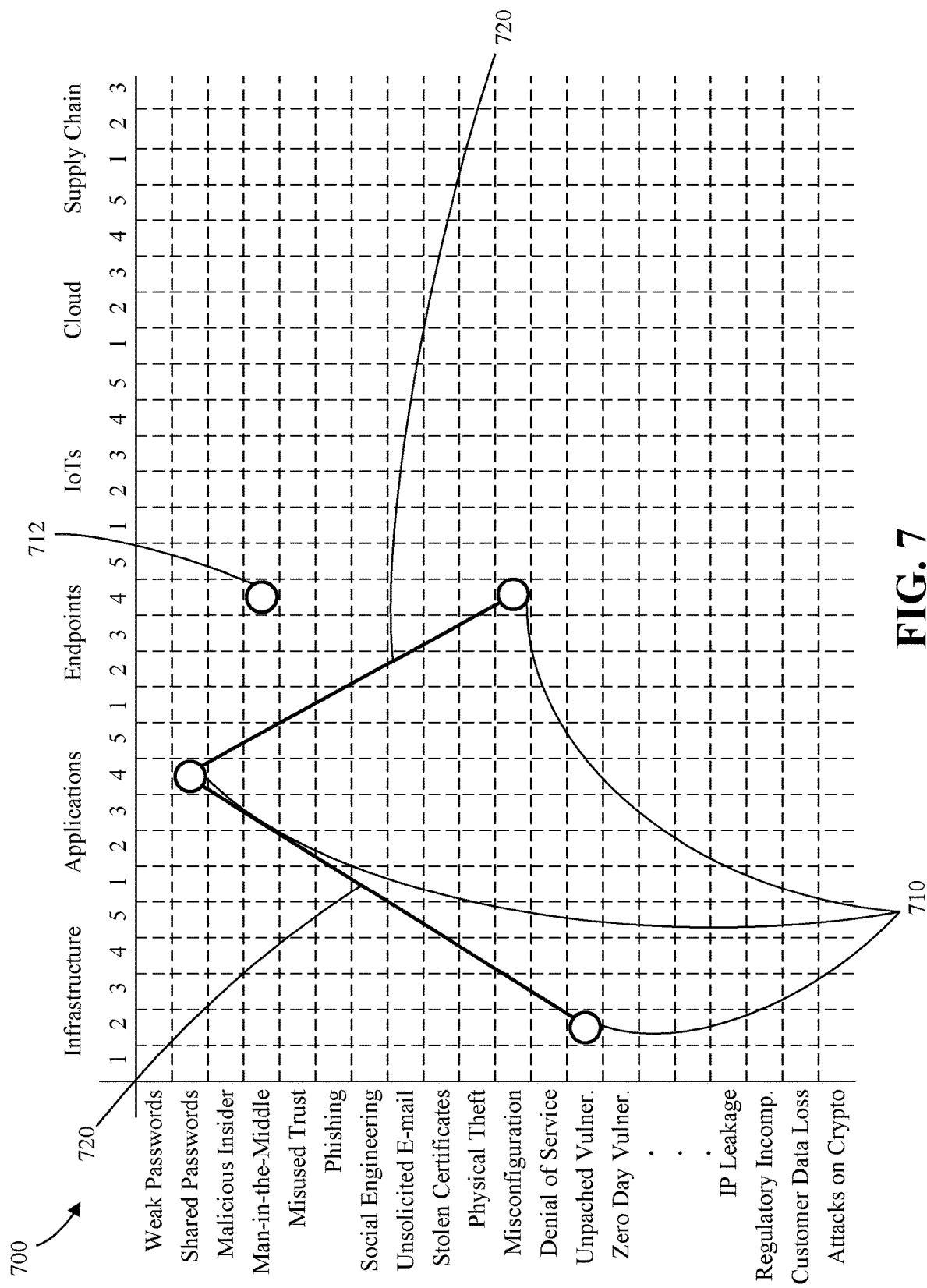
FIG. 7 is an example graph of threat vectors and threat vector linkages.

FIG. 7 is an example graph 700 of threat vectors 710, 712 and threat linkages 720. The rows of graph 700 indicate things that can go wrong with regard to security of CSUT 502, and the columns of graph 700 indicate elements of CSUT 502 (e.g., devices, applications and other software). CSTD 200 can determine the elements of CSUT 502 from the topology graph of CSUT 502. In example graph 700, the numbers of the column headings represent elements of CSUT 502. Those numbers can be replaced with descriptive text indicating elements represented by the numbers. For example, under "Infrastructure," "1" can be replaced by "servers," "2" can be replaced by "storage," "3" can be replaced by "routers," etc. Each threat vector 710 can be indicated in graph 700 to align vertically with a thing that can go wrong due to the threat vector 710, and each threat vector 710 can be indicated in the graph to horizontally align with the element of CSUT 502 where that thing that can go wrong can occur. A plurality of threat vectors 710 having threat linkages 720 between threat vectors 710 can represent a compound threat vector.

Referring again to FIG. 6A, at step 614, CSTD 200, for example risk assessment layer 402, can generate a plurality of fuzzing tests. Fuzzing is an automated software testing method that injects invalid, malformed, or unexpected inputs into a system to reveal software defects and vulnerabilities. The fuzzing tests can be configured to randomize applications inputs to trigger crashes, expose vulnerabilities, and achieve remote code execution. In this regard, the fuzzing tests can identify input setups that result in new vulnerability topologies in CSUT 502. In illustration, the fussing tests can cover a full scope of available combinations of parameters, and focus on security weak points in CSUT 502 that present high levels of security risks (e.g., security risks higher than a threshold level of security risk).

In one or more non-limiting arrangements, the fuzzing tests can be hierarchical fuzzing tests. For example, if at step 610 a computing security threat is identified for a node of a particular branch of the hierarchy graph, CSTD 200 can generate fuzzing tests to test that entire branch of the hierarchy. In this regard, fuzzing tests need not be generated for the entire CSUT 502. Instead, fuzzing tests can be generated to focus on components where issues are identified by the pen-tests.

At step 616 CSTD 200, for example risk assessment layer 402, can run the fuzzing tests and output results of the fuzzing tests to security testing results 234. In illustration, risk assessment layer 402 can include a fuzzing tool configured to randomize applications, inject invalid, malformed, or unexpected inputs into CSUT 502, and then monitor for exceptions. Examples of exceptions can include, but are not limited to, crashes and information leakage. Based on the exceptions, risk assessment layer 402 can identify input setups that result in new vulnerability topologies in CSUT 502. CSTD 200 can output results of the fuzzing tests to security testing results 234.

At decision box 618 CSTD 200, for example risk assessment layer 402, can determine whether there is at least one more input set available. If so, at step 620 CSTD 200, for example risk assessment layer 402, can select a next input set, and the process can return to step 606. The process can iterate until each of the input sets are used at steps 606 through 616.

Referring again to decision box 618, if there are no more input sets that have not been used during the present implementation of method 600, the process can proceed to step 622 of FIG. 6B.

At step 622, CSTD 200, for example risk assessment layer 402, can update graph 700 with new threat vectors and threat linkages resulting from testing performed using the additional input set(s).

At step 624, CSTD 200, for infrastructure policy validation layer 214, can augment the security risks of CSUT 502, including results from the pen-tests and fuzzing tests, as code representation with a t-uple of the group of applicable security rules involved in a threat linkage and the risk metrics relevant to the group of security rules. The relevant group of security rules can be specified by policy/control framework 230, and infrastructure policy validation layer 214 can validate vulnerability detection against policy/control framework 230. For various threat vectors, risk metrics relevant to individual ones of the security rules can be used to compute a score for the entire threat vector. In one or more arrangements, the risk can be represented as code, which can facilitate automation of method 600.

At step 626, CSTD 200, for example infrastructure policy validation layer 214, can assess a t-uple similarity and output results of that assessment to security testing results 234 to a compound risk ontology. In this regard, the assessment can use similarity over an encrypted t-uple. By way of example, if clear details about a security risk are not desired, encrypted information about the threat vector can be used to catalog the threat vector. Instead of comparing in clear the threat vectors for classification, to maintain privacy the similarity of encrypted information about threat vectors can be compared. Thus, instead of determining classifications of threat vectors from scratch, threat vectors can be classified based, at least in part, on the total risk evaluation of similar threat vectors.

At step 628, CSTD 200 can output security testing results 234 as data 250. Data 250 also can include information mapping elements of CSUT 502, such as elements of CSUT 502 indicated in graph 700, to topology graphs for CSUT 502. Data 250 also can map elements of CSUT 502, as well as the topology graphs for CSUT 502, to the compound risk ontology.

Figure 8A:
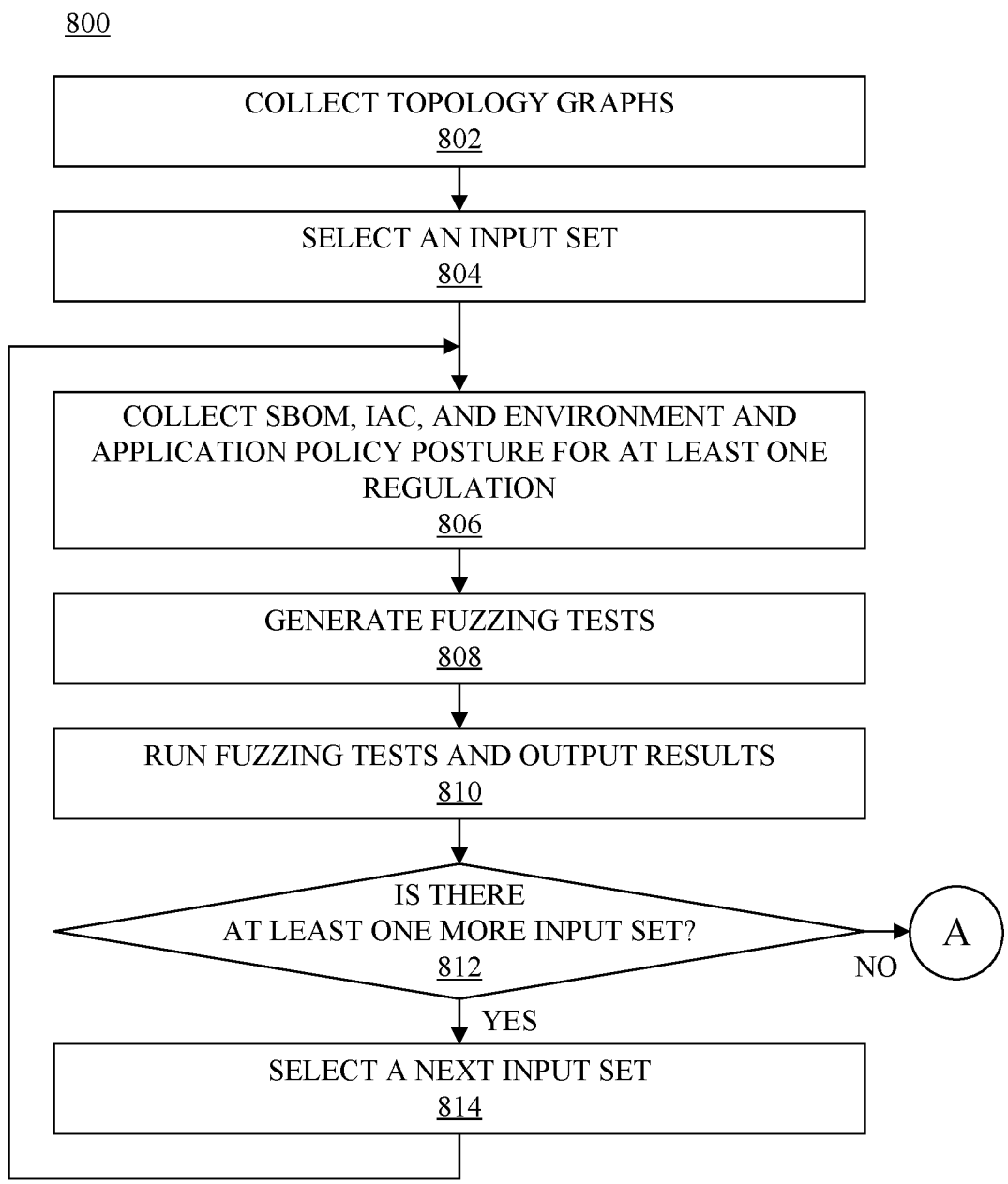
FIGS. 8A and 8B, collectively, are a flowchart illustrating an example of a method of computing security threat detection at pre-deployment of a computing system.
Figure 8B:
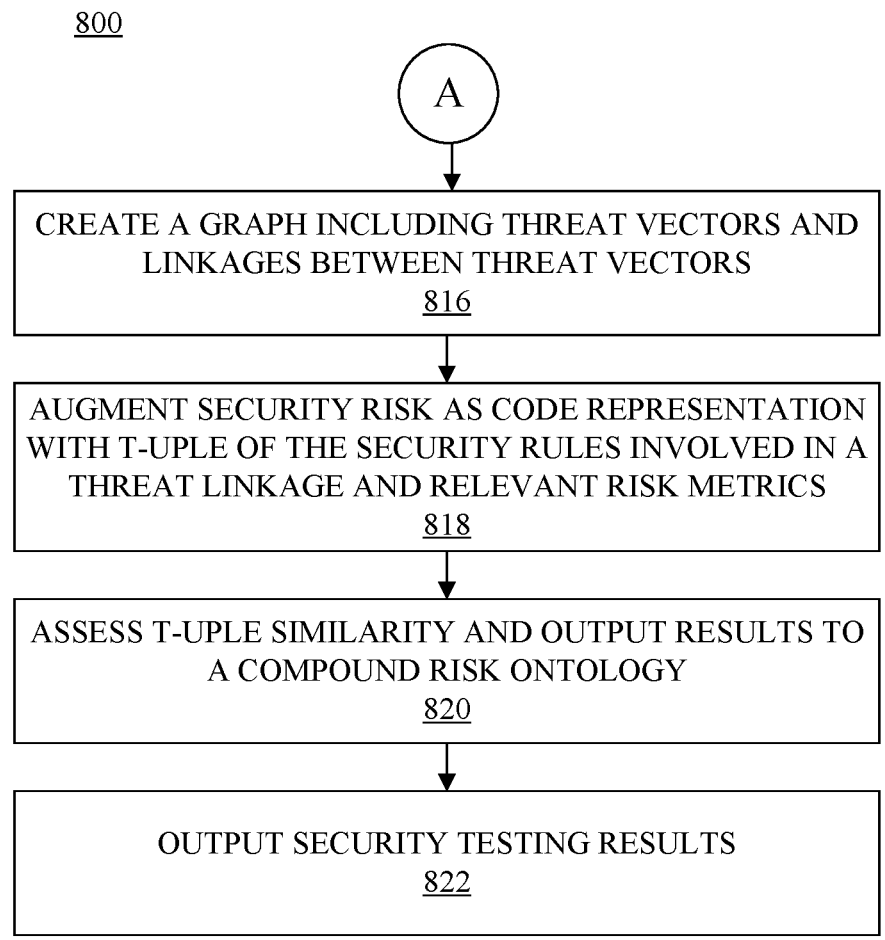

FIGS. 8A and 8B, collectively, are a flowchart illustrating an example of a method 800 of computing security threat detection at pre-deployment of a computing system. Method 800 can be implemented by CSTD 200 in real time.

Referring to FIG. 8A, at step 802 CSTD 200, for example risk assessment layer 402, can collect a variety of topology graphs for CSUT 502. For instance, CSTD 200 can collect topology graphs for applications executing on CSUT 502, hardware components of CSUT 502, networks of CSUT 502, data hosted by CSUT 502, organization charts for one or more organizations assigned to CSUT 502, etc. In illustration, CSTD 200 can execute one or more applications configured to collect topology graphs for CSUT 502. Such an application can, for example, include a scanner that traverses components of CSUT 502 and generate topology graphs based on such traversals. An application also can monitor network flows to, from and within CSUT 502, for example by interfacing with various switches, routers, access points, etc. and collecting data pertaining to network flows. An application also can crawl CSUT 502 to determine data flows to, from and among components of CSUT 502. Further, an application can collect existing charts, such as organization charts stored in one or more databases.

At step 804 CSTD 200, for example risk assessment layer 402, can select an input set from a plurality of input sets. Each input set can include one or more fields of data configured to be input to CSUT 502 during a pen-test and/or fuzzing test.

At step 806 CSTD 200, for example risk assessment layer 402, can collect a software bill of materials (SBOM) and infrastructure as code (IaC) for CSUT 502. In illustration, the SBOM and IaC can be collected from a database stored on a computer readable storage medium to which computer 101 is connected. CSTD 200, for example risk assessment layer 402, also can collect environment and application policy posture for at least one regulation relevant to CSUT 502. In illustration, risk assessment layer 402 can collect the environment and application policy posture in accordance with policy/control framework 230. As noted, policy/control frameworks 230 can include NIST publication 800-53, PCI security standards, GDPR data protection rules, CIS benchmarks, and so on.

At step 808 CSTD 200, for example risk assessment layer 402, can generate a plurality of fuzzing tests. The fuzzing tests can be configured to identify input setups that result in new vulnerability topologies in CSUT 502. In illustration, the fussing tests can cover a full scope of available combinations of parameters, and focus on security weak points in CSUT 502 that present high levels of security risks (e.g., security risks higher than a threshold level of security risk). In one or more non-limiting arrangements, the fuzzing tests can be hierarchical fuzzing tests.

At step 810 CSTD 200 can run the fuzzing tests and output results of the fuzzing tests to security testing results 234. In illustration, risk assessment layer 402 can include a fuzzing tool configured to inject invalid, malformed, or unexpected inputs into CSUT 502, and then monitor for exceptions. Examples of exceptions can include, but are not limited to, crashes and information leakage. Based on the exceptions, risk assessment layer 402 can identify input setups that result in new vulnerability topologies in CSUT 502. CSTD 200 can output results of the fuzzing tests to security testing results 234.

At decision box 812 CSTD 200, for example risk assessment layer 402, can determine whether there is at least one more input set available. If so, at step 814, CSTD 200, for example risk assessment layer 402, can select a next input set, and the process can return to step 806. The process can iterate until each of the input sets are used at steps 806 through 810.

Referring again to decision box 812, if there are no more input sets that have not been used during the present implementation of method 800, the process can proceed to step 816 of FIG. 8B.

At step 816 CSTD 200, for example risk assessment layer 402, can create a graph that includes a plurality of threat vectors, and threat linkages between at least two of the threat vectors, that are detected by the fuzzing tests. CSTD 200 can output the graph of threat vectors and threat linkages to security testing results 234. FIG. 7 is an example graph 700 of threat vectors 710, 712 and threat linkages 720.

At step 818 CSTD 200, for infrastructure policy validation layer 214, can augment the security risks of CSUT 502, including results from the fuzzing tests, as code representation with a t-uple of the group of applicable security rules involved in a threat linkage and the risk metrics relevant to the group of security rules. The relevant group of security rules can be specified by policy/control framework 230, and infrastructure policy validation layer 214 can validate vulnerability detection against policy/control framework 230. For various threat vectors, risk metrics relevant to individual ones of the security rules can be used to compute a score for the entire threat vector. In one or more arrangements, the risk can be represented as code, which can facilitate automation of method 800.

At step 820 CSTD 200, for example infrastructure policy validation layer 214, can assess a t-uple similarity and output results of that assessment to security testing results 234 to a compound risk ontology. In this regard, the assessment can use similarity over an encrypted t-uple. By way of example, if clear details about a security risk are not desired, encrypted information about the threat vector can be used to catalog the threat vector. Instead of comparing in clear the threat vectors for classification, to maintain privacy the similarity of encrypted information about threat vectors can be compared. Thus, instead of determining classifications of threat vectors from scratch, threat vectors can be classified based, at least in part, on the total risk evaluation of similar threat vectors.

At step 822 CSTD 200 can output security testing results 234 as data 250. Data 250 also can include information mapping elements of CSUT 502, such as elements of CSUT 502 indicated in graph 700, to topology graphs for CSUT 502. Data 250 also can map elements of CSUT 502, as well as the topology graphs for CSUT 502, to the compound risk ontology.

The foregoing description is just an example of embodiments of the invention, and variations and substitutions. While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising." when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising." when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting." depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per sc.

As defined herein, the term "penetration test," also known as "pen-test," means a simulated cyber attack against a computing system to test for exploitable security vulnerabilities in the computing system.

As defined herein, the term "threat vector" means a specific path, method or scenario that can be exploited to compromise security of a computing system.

As defined herein, the term "threat linkage" means a link between at least two threat vectors through which the threat vectors are susceptible to being exploited to traverse security vulnerabilities in a computing system.

As defined herein, the term "computing system" means a system comprising at least one server and at least one network.

As defined herein, the term "t-uple" means a tuble with an unknown number of t attributes.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "user" means a person (i.e., a human being).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   collecting at least one topology graph for a computing system;
   collecting an environment and application policy posture for at least one regulation relevant to the computing system;
   generating, using a processor, a plurality of penetration tests, wherein
      the plurality of penetration tests is determined based on the at least one topology graph for the computing system and the environment and application policy posture for the at least one regulation relevant to the computing system, and
      the generating of the plurality of penetration tests comprises determining a hierarchy graph comprising components of the computing system as a plurality of nodes;
   responsive to the generating of the plurality of penetration tests, running the plurality of penetration tests against the computing system based on the hierarchy graph of the computing system;
   determining, based on the running of the plurality of penetration tests, a plurality of threat vectors and at least one threat linkage between at least two of the plurality of threat vectors,
      wherein a threat vector of the plurality of threat vectors corresponds to a computing security threat associated with a node, of the plurality of nodes, of a particular branch of the hierarchy graph;
   responsive to the running of the plurality of penetration tests against the computing system, outputting the plurality of threat vectors and the at least one threat linkage between the at least two of the plurality of threat vectors; and
   generating, based on the running of the plurality of penetration tests, a plurality of fuzzing tests to test the particular branch, of the hierarchy graph, that includes the node associated with the computing security threat.

2. The computer-implemented method of claim 1, further comprising:
   responsive to the running of the plurality of penetration tests against the computing system, creating a graph comprising the plurality of threat vectors and the at least one threat linkage between the at least two of the plurality of threat vectors; and
   outputting the graph comprising the plurality of threat vectors and the at least one threat linkage between the at least two of the plurality of threat vectors.

3. The method of claim 1, further comprising:
   responsive to the generating of the plurality of fuzzing tests, running the plurality of fuzzing tests against the computing system, the plurality of fuzzing tests identifying input setups that result in new vulnerability topologies in the computing system; and
   responsive to the running of the plurality of fuzzing tests against the computing system, outputting the input setups that result in the new vulnerability topologies in the computing system.

4. The computer-implemented method of claim 1, further comprising:
   augmenting security risks of the computing system, the security risks of the computing system comprising the plurality of threat vectors and the at least one threat linkage between the at least two of the plurality of threat vectors, as code representation with a t-uple of a group of applicable security rules involved in the at least one threat linkage and risk metrics relevant to the group of applicable security rules.

5. The computer-implemented method of claim 4, further comprising:
assessing a t-uple similarity; and
outputting results from the assessing of the t-uple similarity to a compound risk ontology.

6. The computer-implemented method of claim 5, further comprising:
mapping the components of the computing system to the compound risk ontology.

7. The computer-implemented method of claim 5, further comprising:
mapping the at least one topology graph for the computing system to the compound risk ontology.

8. A system, comprising:
a processor programmed to initiate executable operations comprising:
collecting at least one topology graph for a computing system;
collecting an environment and application policy posture for at least one regulation relevant to the computing system;
generating a plurality of penetration tests, wherein
the plurality of penetration tests is determined based on the at least one topology graph for the computing system and the environment and application policy posture for the at least one regulation relevant to the computing system, and
the generating of the plurality of penetration tests comprises determining a hierarchy graph comprising components of the computing system as a plurality of nodes;
responsive to the generating of the plurality of penetration tests, running the plurality of penetration tests against the computing system based on hierarchy graph of the computing system;
determining, based on the running of the plurality of penetration tests, a plurality of threat vectors and at least one threat linkage between at least two of the plurality of threat vectors,
wherein a threat vector of the plurality of threat vectors corresponds to a computing security threat associated with a node, of the plurality of nodes, of a particular branch of the hierarchy graph;
responsive to the running of the plurality of penetration tests against the computing system, outputting the plurality of threat vectors and the at least one threat linkage between the at least two of the plurality of threat vector; and
generating, based on the running of the plurality of penetration tests, a plurality of fuzzing tests to test the particular branch, of the hierarchy graph, that includes the node associated with the computing security threat.

9. The system of claim 8, the executable operations further comprising:
responsive to the running of the plurality of penetration tests against the computing system, creating a graph comprising the plurality of threat vectors and the at least one threat linkage between the at least two of the plurality of threat vectors; and
outputting the graph comprising the plurality of threat vectors and the at least one threat linkage between the at least two of the plurality of threat vectors.

10. The system of claim 8, the executable operations further comprising:
responsive to the generating of the plurality of fuzzing tests, running the plurality of fuzzing tests against the computing system, the plurality of fuzzing tests identifying input setups that result in new vulnerability topologies in the computing system; and
responsive to the running of the plurality of fuzzing tests against the computing system, outputting the input setups that result in the new vulnerability topologies in the computing system.

11. The system of claim 8, the executable operations further comprising:
augmenting security risks of the computing system, the security risks of the computing system comprising the plurality of threat vectors and the at least one threat linkage between the at least two of the plurality of threat vectors, as code representation with a t-uple of a group of applicable security rules involved in the at least one threat linkage and risk metrics relevant to the group of applicable security rules.

12. The system of claim 11, the executable operations further comprising:
assessing a t-uple similarity; and
outputting results from the assessing of the t-uple similarity to a compound risk ontology.

13. The system of claim 12, the executable operations further comprising:
mapping the components of the computing system to the compound risk ontology.

14. The system of claim 12, the executable operations further comprising:
mapping the at least one topology graph for the computing system to the compound risk ontology.

15. A computer program product, comprising:
one or more computer readable storage mediums having program code stored thereon, the program code stored on the one or more computer readable storage mediums collectively executable by a data processing system to initiate operations including:
collecting at least one topology graph for a computing system;
collecting an environment and application policy posture for at least one regulation relevant to the computing system;
generating a plurality of penetration tests, wherein
the plurality of penetration tests is determined based on the at least one topology graph for the computing system and the environment and application policy posture for the at least one regulation relevant to the computing system, and
the generating of the plurality of penetration tests comprises determining a hierarchy graph comprising components of the computing system as a plurality of nodes;
responsive to the generating of the plurality of penetration tests, running the plurality of penetration tests against the computing system based on the hierarchy graph of the computing system;
determining, based on the running of the plurality of penetration tests, a plurality of threat vectors and at least one threat linkage between at least two of the plurality of threat vectors, wherein a threat vector of the plurality of threat vectors corresponds to a computing security threat associated with a node, of the plurality of nodes, of a particular branch of the hierarchy graph;

responsive to the running of the plurality of penetration tests against the computing system, outputting the plurality of threat vectors and the at least one threat linkage between the at least two of the plurality of threat vectors; and generating, based on the running of the plurality of penetration tests, a plurality of fuzzing tests to test the particular branch, of the hierarchy graph, that includes the node associated with the computing security threat.

16. The computer program product of claim 15, wherein the program code is executable by the data processing system to initiate the operations further comprising:

responsive to the running of the plurality of penetration tests against the computing system, creating a graph comprising the plurality of threat vectors and the at least one threat linkage between the at least two of the plurality of threat vectors; and outputting the graph comprising the plurality of threat vectors and the at least one threat linkage between the at least two of the plurality of threat vectors.

17. The computer program product of claim 15, wherein the program code is executable by the data processing system to initiate the operations further comprising:

responsive to the generating of the plurality of fuzzing tests, running the plurality of fuzzing tests against the computing system, the plurality of fuzzing tests identifying input setups that result in new vulnerability topologies in the computing system; and responsive to the running of the plurality of fuzzing tests against the computing system, outputting the input setups that result in the new vulnerability topologies in the computing system.

18. The computer program product of claim 15, wherein the program code is executable by the data processing system to initiate the operations further comprising:

augmenting security risks of the computing system, the security risks of the computing system comprising the plurality of threat vectors and the at least one threat linkage between the at least two of the plurality of threat vectors, as code representation with a t-uple of a group of applicable security rules involved in the at least one threat linkage and risk metrics relevant to the group of applicable security rules.

19. The computer program product of claim 18, wherein the program code is executable by the data processing system to initiate the operations further comprising:

assessing a t-uple similarity; and output results from the assessing the t-uple similarity to a compound risk ontology.

20. The computer program product of claim 19, wherein the program code is executable by the data processing system to initiate the operations further comprising:

mapping the components of the computing system to the compound risk ontology.

\* \* \* \* \*